(12) United States Patent
Kun-Yuan

(10) Patent No.: US 6,623,115 B1
(45) Date of Patent: Sep. 23, 2003

(54) GUIDING WASHER FOR A HINGE OF AN EYEGLASS FRAME

(75) Inventor: Lo Kun-Yuan, Shinjuang (TW)

(73) Assignee: Ching Lan Co., Ltd., Taipei Hsien (TW)

( * ) Notice: Subject to any disclaimer, the term of this patent is extended or adjusted under 35 U.S.C. 154(b) by 0 days.

(21) Appl. No.: 10/214,617

(22) Filed: Aug. 9, 2002

(51) Int. Cl.[7] ............................................... G02B 5/22
(52) U.S. Cl. ................................... 351/153; 16/228
(58) Field of Search .................... 351/153, 140, 351/141; 16/228

(56) References Cited

U.S. PATENT DOCUMENTS 6,336,250 B1 * 1/2002 Takeda et al. .............. 16/228

* cited by examiner

Primary Examiner—Hung Xuan Dang
(74) Attorney, Agent, or Firm—Bacon & Thomas, PLLC

(57) ABSTRACT

A guiding washer is provided to a spring hinge of eyeglasses. The guiding washer is disposed between a male part and a female part of the spring hinge, which are made of titanium alloy, in such a manner that the washers can't pivot on the female part, and the male part can pivot on the washers. The washers are intended to reduce friction of the hinge's parts against each other when the male part is being pivoted on the female part, thus effectively increasing the smoothness of pivotal movement of the male part when in use.

1 Claim, 4 Drawing Sheets

GUIDING WASHER FOR A HINGE OF AN EYEGLASS FRAME

BACKGROUND OF THE INVENTION

1. Field of the Invention

The present invention relates to a guiding washer for a hinge of eyeglass frame, more particularly a guiding washer which can help reduce wear on titanium-alloy parts of the hinge caused by continuous friction between the hinge parts over a long period, and which is relatively uncomplicated in structure.

2. Brief Description of the Prior Art

Spring hinges are used for connecting the temples of eyeglasses to the rim of eyeglasses in order to provide moderate resistance so as to prevent eyeglasses from slipping down due to perspiration on the user's face. Titanium alloy is a very popular material for use in eyeglasses spring hinges. However, friction between parts of the hinge is likely to cause wear to the hinge, and reduce the service life of the eyeglasses.

DETAILED DESCRIPTION OF THE PREFERRED EMBODIMENT

Figure 1:
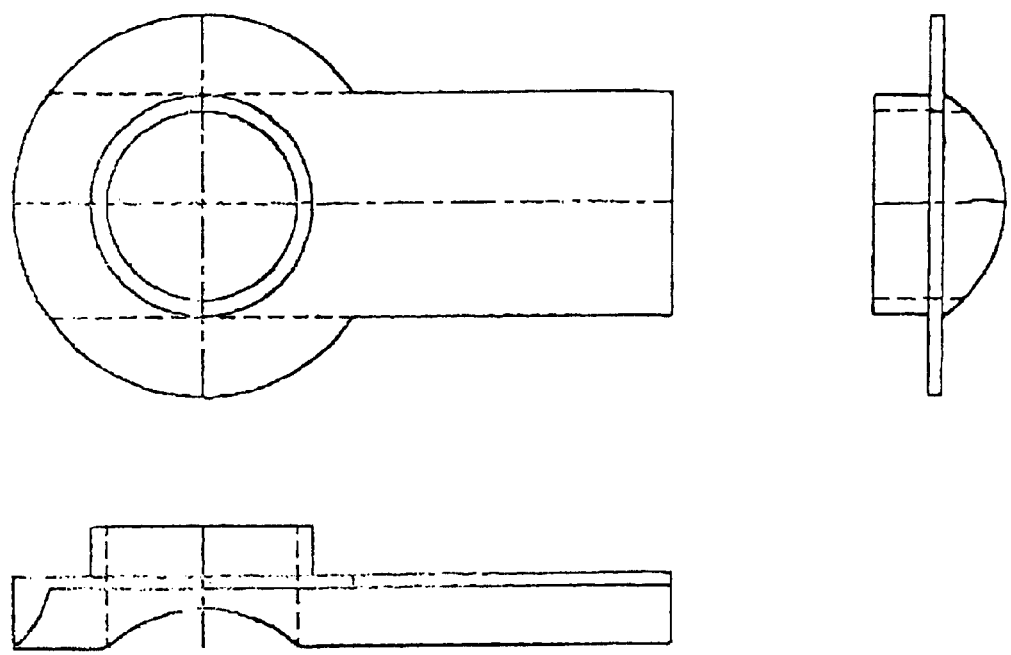
FIG. 1 shows plans of the guiding washer of a spring hinge of eyeglasses according to the present invention.
Figure 2:
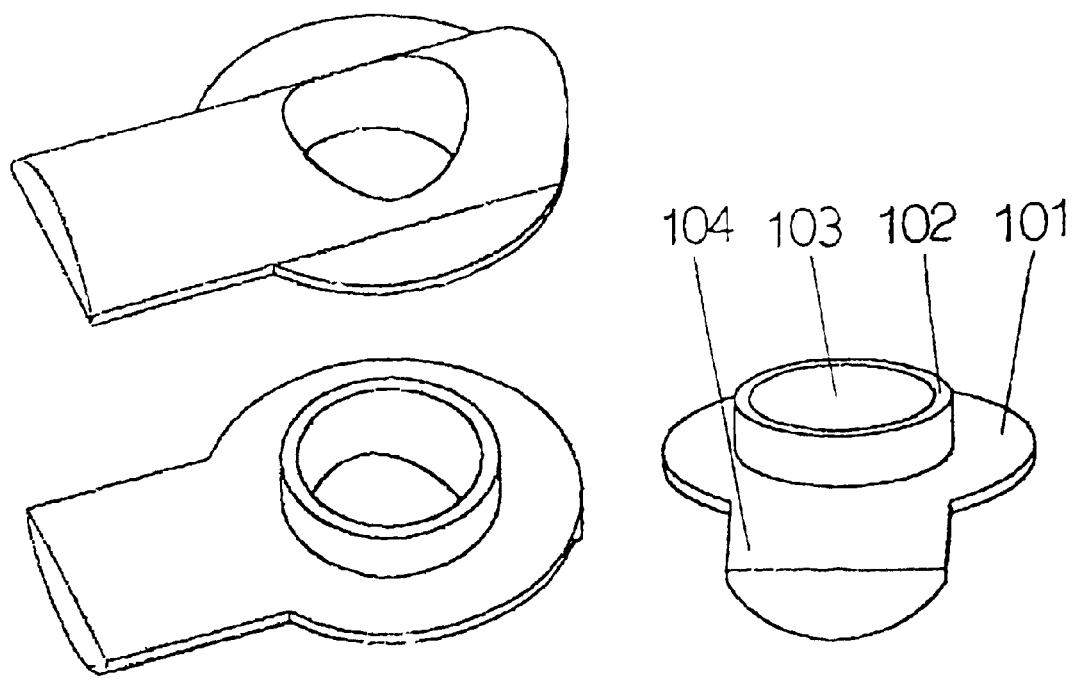
FIG. 2 shows perspective views of the guiding washer of a spring hinge of eyeglasses according to the present invention.
Figure 3:
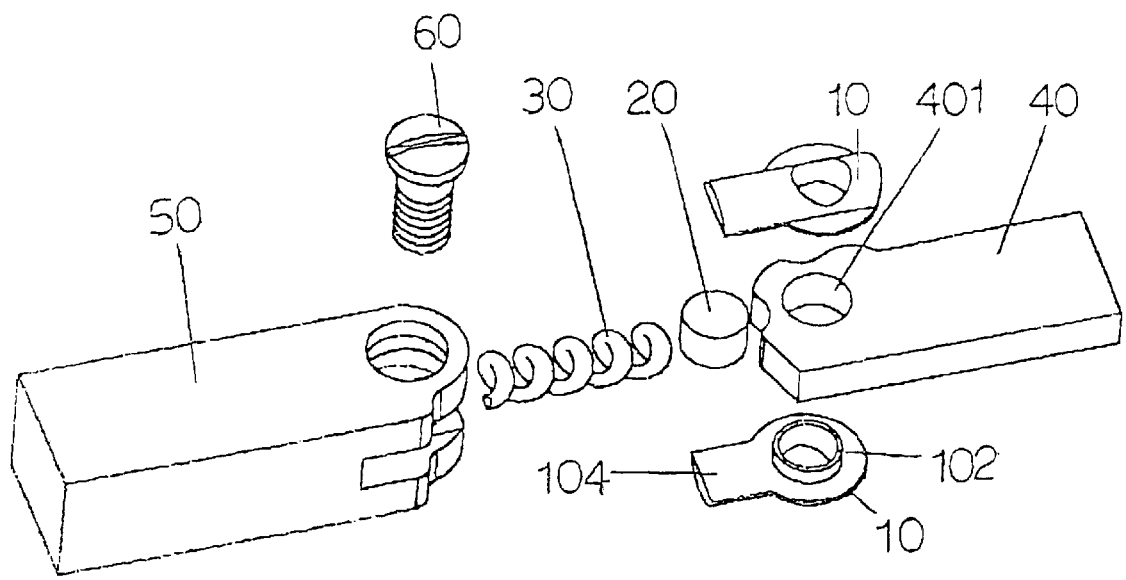
FIG. 3 is an exploded perspective view of the spring hinge of eyeglasses with the guiding washer according to the present invention.
Figure 4:
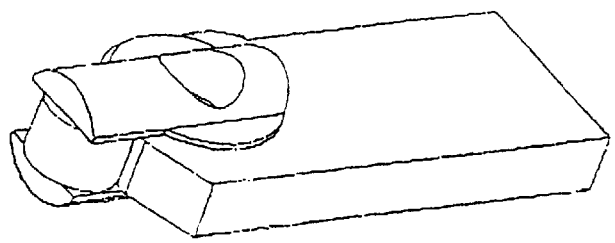
FIG. 4 is a perspective view of the male hinge part with the guiding washer according to the present invention.
Figure 5:
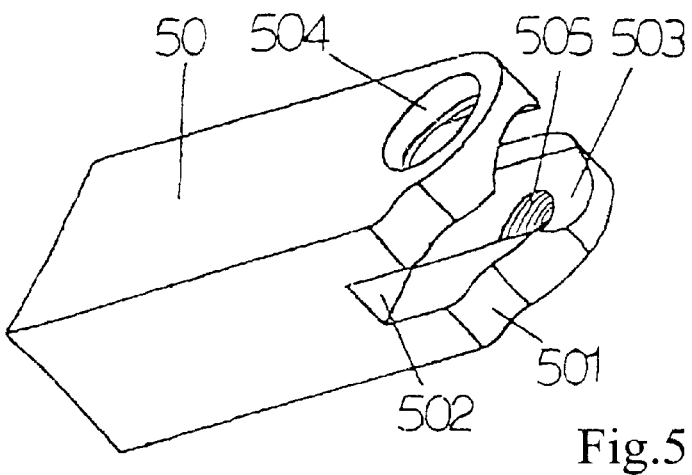
FIG. 5 is a perspective view of the female hinge part according to the present invention.
Figure 6:
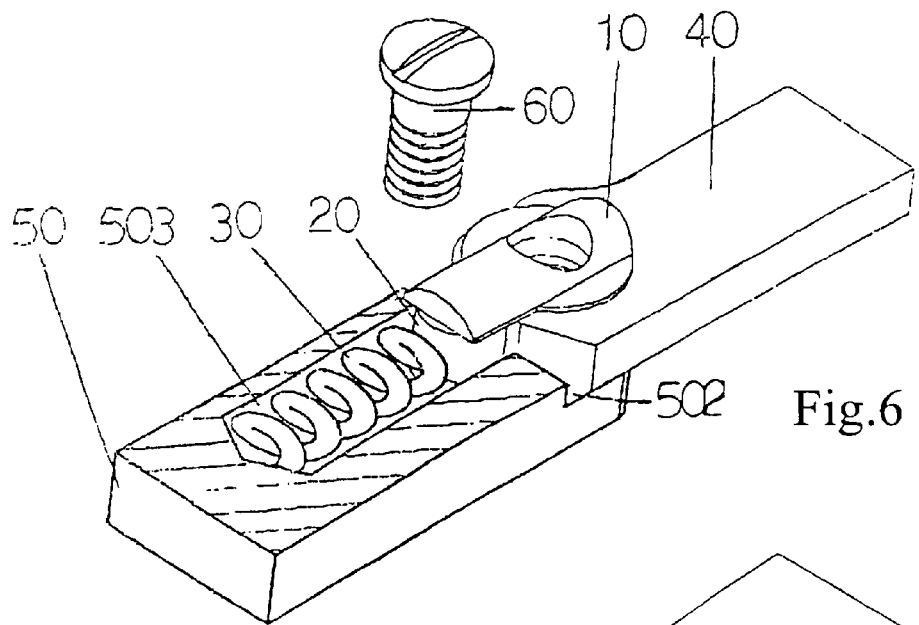
FIG. 6 is a partial cross-sectional view of the spring hinge of eyeglasses with the guiding washer according to the present invention.
Figure 7:
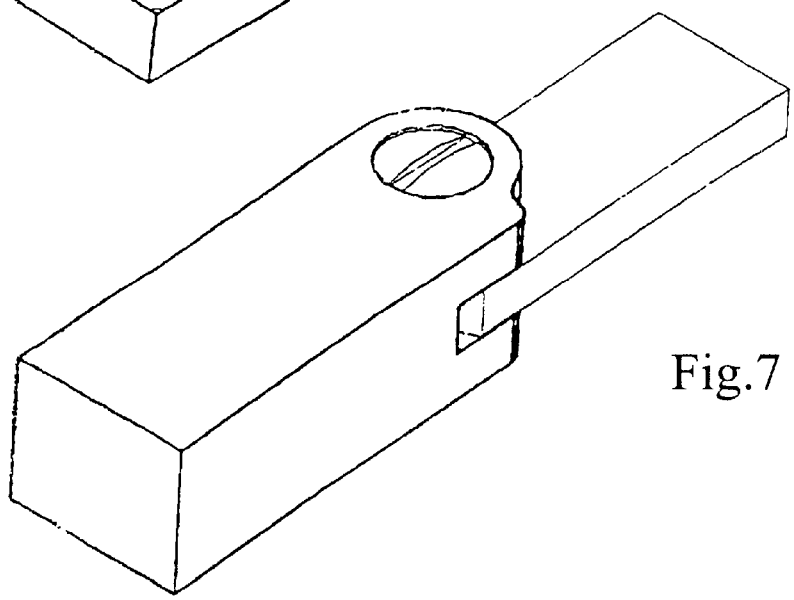
FIG. 7 is a perspective view of the spring hinge of eyeglasses with the guiding washer according to the present invention.

Referring to FIGS. 1, and 2, a guiding washer 10 for a spring hinge of eyeglasses of the present invention is illustrated.

The guiding washer 10 is made by means of punching and pressing. The guiding washer 10 has a disk portion 101, and a strengthening arm 104 extending beyond the edge of the disk portion 101. The guiding washer 10 has a round hole 103 extending through the center of the disk portion 101. Furthermore, the strengthening arm 104 has a flat side facing in the same direction as the first side of corresponding disk portion 101, and a curved side in an opposite direction, which is coplanar with a second side of the disk portion 101. An annular protrusion 102 projects from the first side of the disk portion 101 of the guiding washer 10.

Referring to FIGS. 3, 4, 5, 6, and 7, a spring hinge of eyeglasses includes a male part 40, and a female part 50. The male part 40 has a round hole 401 on the front end thereof. The front end of the female part 50 extends two hinge bodies 501 in parallel. A central aperture 502 is formed between two hinge bodies 501. The insides of two hinge bodies 501 form two curved trenches 503. One hinge body 501 has a round sink hole 504 and another hinge body 501 has a round connecting hole 505 having threads formed thereon, which is aligned with the round sink hole 504. A spring 30 is received in the central aperture 502 of the female pat 50. A cylindrical roller 20 is disposed adjacent to the outward end of the spring 30.

The guiding washers 10 are pivotally fitted to the two flat sides of the male part 40 with the annular protrusion 102 being inserted into the round hole 401 of the male part 40. The guiding washers 10 can be made of galvanized steel or stainless steel so that they have less friction against the male part 40. The front end of the male part 40 with the guiding washers 10 is fitted between two hinge bodies 501 in the central aperture 502 of the female part 50 of the spring hinge. A bolt 60 is passed through the round hole 504 of the female part 50, the round hole 103 of the guiding washers 10 and the round hole 401 of the male part 40, and is screwed into the connecting hole 505 of the female part 50 for allowing pivotal movement of the male part 40 on the female part 50.

Figure 8:
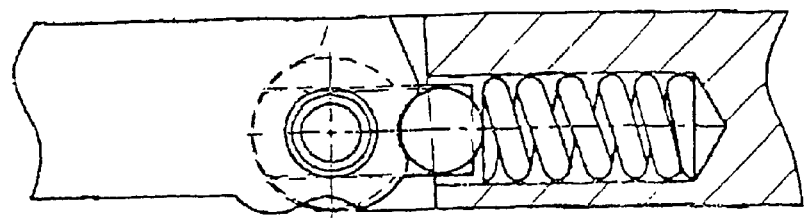
FIG. 8 is a partial cross-sectional view of the spring hinge of eyeglasses in straight position according to the present invention.
Figure 9:
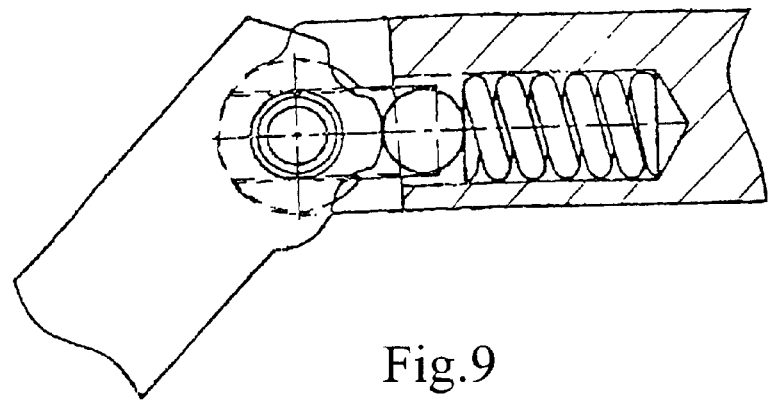
FIG. 9 is a partial cross-sectional view of the spring hinge of eyeglasses in semi-folded position according to the present invention; and, FIG. 10 is a partial cross-sectional view of the spring hinge of eyeglasses in folded position according to the present invention.
Figure 10:
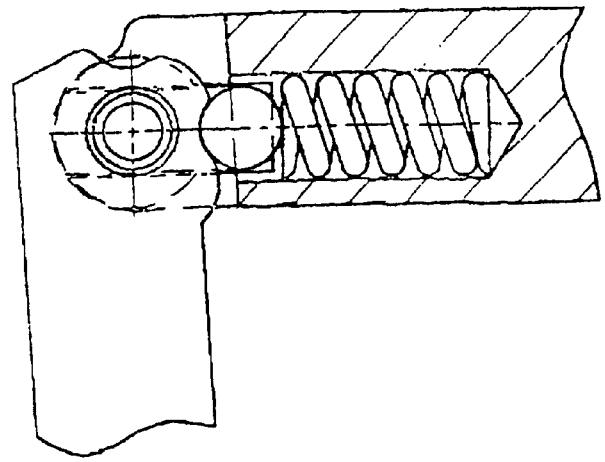

Referring to FIGS. 8, 9, and 10, the cylindrical roller 20 is disposed between the ends of the male part 40 and the female part 50, and the roller 20 is biased outwards by the spring 30 to increase resistance against pivotal movement of the male part 40 on the female part 50. The curved sides of the arms 104 of the guiding washers 10 are fitted onto corresponding curved trenches 503 of the female part 50 to prevent the washers 10 from pivoting on the female part 50.

From the above description, it can be understood that the guiding washer for a spring hinge of eyeglasses of the present invention has desirable features as following:

1. Because the spring hinges of many eyeglasses are made of titanium alloy, and because the guiding washers 10 are made of galvanized steel or stainless steel, there is less friction against the male part 40 when the male part 40 is being pivoted on the female part 50, allowing the hinge to be used with little wear and to have longer service life.
2. The disk portions 101 of the pads 10 effectively increase the area of the pads' contact with the male part 40, and effectively increase of the width of those portions of the washers that lie between the holes 103 and the outer edges. Therefore, the washers 10 allow the male part 40 to pivot smoothly, and are relatively strong.

3. The washers 10 are made by means of punching and pressing. The cost thereof is therefore relatively low.

What is claimed is:

1. A guiding washer for a spring hinge of eyeglasses, having a disk portion, and a strengthening arm extending beyond the edge of the disk portion; a round hole is formed on the center of the disk portion; the strengthening arms has a flat side which is a coplanar with a first side of the disk portion, and a curved side in an opposite thereof, the surround of the round hole forms an annular protrusion projecting from the first side of the disk portion;

the spring hinge of eyeglasses includes a male part and a female part pivotally screwed each other, the male part has a round hole on the front end thereof, and the front end of the female part extends two hinge bodies in parallel, a spring is received between two hinge bodies, a spring-biased cylindrical roller is disposed adjacent to the front end of the male part against the spring;

two guiding washers are pivotally fitted to respective sides of the male part with the annular protrusion being inserted into the round hole; the arms of the guiding washers are fitted between hinge bodies of the female part to prevent the washers from pivoting on the female part.

\* \* \* \* \*